United States Patent
Seidner

(10) Patent No.: US 8,324,843 B2
(45) Date of Patent: Dec. 4, 2012

(54) CIRCUIT ARRANGEMENT FOR THE SELECTIVE OPERATION OF AT LEAST TWO ELECTRIC MACHINES

(75) Inventor: Hans Seidner, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 454 days.

(21) Appl. No.: 12/602,281

(22) PCT Filed: May 27, 2008

(86) PCT No.: PCT/EP2008/056465
§ 371 (c)(1),
(2), (4) Date: Nov. 30, 2009

(87) PCT Pub. No.: WO2008/145647
PCT Pub. Date: Dec. 4, 2008

(65) Prior Publication Data
US 2010/0181834 A1    Jul. 22, 2010

(30) Foreign Application Priority Data

May 30, 2007   (DE) .......................... 10 2007 025 256
Feb. 8, 2008   (DE) .......................... 10 2008 008 046

(51) Int. Cl.
*H02P 5/00* (2006.01)
(52) U.S. Cl. .. 318/34; 318/83; 318/400.22; 318/400.26; 361/91.1
(58) Field of Classification Search .............. 318/34, 318/83, 107, 400.2, 400.22, 400.26, 800; 363/71, 72; 323/272; 361/23, 32, 91.1
See application file for complete search history.

(56) References Cited

U.S. PATENT DOCUMENTS

| | | | |
|---|---|---|---|
| 4,837,491 A | | 6/1989 | Fujioka et al. |
| 5,388,021 A | * | 2/1995 | Stahl ............................... 361/56 |
| 5,521,470 A | * | 5/1996 | Yang ............................... 318/83 |
| 6,008,614 A | | 12/1999 | Imai |
| 6,166,500 A | * | 12/2000 | Makaran .................. 318/400.22 |
| 6,437,955 B1 | * | 8/2002 | Duffy et al. ..................... 361/45 |
| 6,630,805 B2 | * | 10/2003 | Makaran .................. 318/400.26 |
| 6,812,657 B2 | * | 11/2004 | Raimondi ..................... 318/107 |
| 6,859,374 B2 | * | 2/2005 | Pollanen et al. ................ 363/69 |
| 7,113,380 B2 | * | 9/2006 | Youm .......................... 361/91.1 |
| 7,339,345 B2 | * | 3/2008 | Degner et al. ................. 318/800 |
| 7,514,909 B2 | * | 4/2009 | Burstein et al. ............... 323/272 |
| 7,522,436 B2 | * | 4/2009 | Schultz et al. .................. 363/72 |
| 7,616,463 B2 | * | 11/2009 | Burstein ......................... 363/72 |
| 7,688,607 B2 | * | 3/2010 | Schultz .......................... 363/72 |
| 7,795,850 B2 | * | 9/2010 | Burstein et al. ............... 323/272 |

(Continued)

FOREIGN PATENT DOCUMENTS

DE    12 31 747 B    1/1987

(Continued)

*Primary Examiner* — Paul Ip
(74) *Attorney, Agent, or Firm* — Henry M. Feiereisen LLC

(57) ABSTRACT

The invention relates to a circuit arrangement for the selective operation of at least two electric machines (1, 2) that are each supplied via a plurality of phase lines, comprising:—one voltage protection module (5) for limiting an intermediate circuit voltage,—one switch arrangement (4) for selecting one of the electric machines by switching the phase lines;— first choke inductivities (8) in each of the plurality of phase lines between the circuit arrangement (4) and the voltage protection module (5), wherein one second choke inductivity (9') each may be switched parallel to one or more first choke inductivities (8) as a function of the selected electric machine (1, 2), can be switched.

8 Claims, 1 Drawing Sheet

U.S. PATENT DOCUMENTS

| | | | |
|---|---|---|---|
| 7,825,643 B2 * | 11/2010 | Burstein et al. | 323/272 |
| 7,830,688 B1 * | 11/2010 | Schultz et al. | 363/72 |
| 7,977,923 B2 * | 7/2011 | Pelrine et al. | 320/166 |
| 8,014,180 B2 * | 9/2011 | Schultz | 363/72 |
| 2002/0180296 A1 * | 12/2002 | Nickoladze et al. | 310/166 |
| 2004/0032755 A1 * | 2/2004 | Pollanen et al. | 363/71 |
| 2004/0136133 A1 * | 7/2004 | Youm | 361/91.1 |
| 2007/0013250 A1 * | 1/2007 | Nickoladze et al. | 310/112 |
| 2007/0075691 A1 * | 4/2007 | Burstein et al. | 323/272 |
| 2007/0076452 A1 * | 4/2007 | Schultz | 363/72 |
| 2007/0076453 A1 * | 4/2007 | Schultz et al. | 363/72 |
| 2007/0076454 A1 * | 4/2007 | Burstein et al. | 363/72 |
| 2007/0076455 A1 * | 4/2007 | Burstein | 363/72 |
| 2007/0176574 A1 * | 8/2007 | Degner et al. | 318/800 |
| 2008/0036301 A1 * | 2/2008 | McDonald | 307/108 |
| 2008/0218132 A1 * | 9/2008 | Pelrine et al. | 322/2 A |
| 2008/0303367 A1 * | 12/2008 | Nickoladze et al. | 310/114 |
| 2010/0026122 A1 * | 2/2010 | Nickoladze et al. | 310/114 |
| 2010/0085000 A1 * | 4/2010 | Todd et al. | 318/400.2 |
| 2010/0109582 A1 * | 5/2010 | Terode | 318/400.2 |
| 2010/0225287 A1 * | 9/2010 | Schultz | 323/272 |
| 2010/0320854 A1 * | 12/2010 | Yamazaki et al. | 310/72 |
| 2011/0032733 A1 * | 2/2011 | Watanabe et al. | 363/21.14 |
| 2011/0140555 A1 * | 6/2011 | Nickoladze et al. | 310/72 |

FOREIGN PATENT DOCUMENTS

EP    1 524 761 A2    4/2005

* cited by examiner

CIRCUIT ARRANGEMENT FOR THE SELECTIVE OPERATION OF AT LEAST TWO ELECTRIC MACHINES

CROSS-REFERENCES TO RELATED APPLICATIONS

This application is the U.S. National Stage of International Application No. PCT/EP2008/056456, filed May 27, 2008, which designated the United States and has been published as International Publication No. WO 2008/145647 and which claims the priorities of German Patent Applications, Serial No. 10 2007 025 256.2, filed May 30, 2007, and 10 2008 008 046.2, filed Feb. 8, 2008, pursuant to 35 U.S.C. 119(a)-(d).

BACKGROUND OF THE INVENTION

The invention relates to a circuit arrangement for the operation of at least two electric machines with a different inductance requirement being placed on a converter power section.

In the machine tool industry, specifically in machining centers, there is increasingly the need to operate at least two spindles with the corresponding drives using one power section. In this case, different spindles, which are each driven by an electric machine, are used for machining, for example roughturning and fine machining/planing. The replacement of the spindles generally takes place via a tool robot. In this case, the two spindles driven by synchronous motors are intended to be operated in an inexpensive manner using one power section.

The electric machines are often in the form of synchronous motors. Owing to the need to operate the electric machines at a certain power in the field weakening range, a choke inductance is required as a series inductor (series inductance), which needs to be matched to the inductance of the respective electric machine. Inexpensive circuitry for the choke inductances and the electric machines for both operating cases is therefore desired.

In the event of failure of the power section/actuating drive (pulse suppression) in the case of a maximum speed of the electric machine, said electric machine acts as a generator. In this case, a generator voltage (EMF) of up to several kV can be produced, which can damage or destroy other components in the drive circuit. A voltage protection module VPM limits this voltage, for example to a maximum of 830 V, by virtue of the fact that the three phase lines are short-circuited in the corresponding case. The circuit for driving the electric machines including the associated choke inductances therefore needs to be selected in such a way that the generator voltage is safely limited even in the event of a voltage failure.

SUMMARY OF THE INVENTION

An object of the invention is to provide advantageous circuitry for the abovementioned components, wherein it is intended for the number of components required to be reduced to a minimum and the function of the voltage protection module for the operation of both electric machines continues to be ensured.

According to one aspect of the invention, the object is achieved by a circuit arrangement for the selective operation of at least two electric machines, which are each supplied via a plurality of phase lines, including a voltage protection module for limiting an intermediate circuit voltage, a switch arrangement for selecting one of the electric machines by switching over the phase lines; first choke inductances in each of the plurality of phase lines between the switch arrangement and the voltage protection module, wherein in each phase line a second choke inductance can be connected in parallel with one or more corresponding first choke inductances, depending on the selected electric machine.

According to another aspect of the invention, the object is achieved by a drive system which includes a circuit arrangement, as set forth above, and a plurality of electric machines.

According to yet another aspect of the invention, the object is achieved by a method for the operation of at least two electric machines which are each supplied via a plurality of phase lines, a voltage protection module being provided for limiting an intermediate circuit voltage, and one of the electric machines being selected by switching over the phase lines by means of a switching arrangement, with one second choke inductance being switchably connected in parallel with one or more first choke inductances, which are arranged in each of the plurality of phase lines between the switch arrangement and the voltage protection module, depending on the selected electric machine.

Further advantageous refinements of the invention are specified in the dependent claims.

One aspect provides a circuit arrangement for the selective operation of at least two electric machines, which are each supplied via a plurality of phase lines, comprising:
  a voltage protection module for limiting an intermediate circuit voltage,
  a switch arrangement for selecting one of the electric machines by switching over the phase lines;
  first choke inductances in each of the plurality of phase lines between the switch arrangement and the voltage protection module,
wherein in each case a second choke inductance can be connected in parallel with one or a plurality of the first choke inductances, depending on the electric machine selected.

The circuit arrangement advantageously makes it possible to reduce the number of components required for operation of two electric machines using one power section.

Furthermore, the voltage protection module may be designed to short-circuit the phase lines depending on an intermediate circuit voltage.

In accordance with one embodiment, the second choke inductance can be connectable into the circuit by a contactor depending on a switching signal, the switching signal being provided for driving the switch arrangement.

In accordance with a further aspect, a drive system with the above circuit arrangement and with a plurality of electric machines is provided.

In this case, the first choke inductances can be designed in such a way that a first of the electric machines can be operated in the field weakening mode of operation, and the second choke inductances can be designed in such a way that a second of the electric machines can be operated in the field weakening mode of operation when the first and second choke inductances are connected in parallel in at least one of the phase lines, the second choke inductances not being connected into the circuit when the first electric machine is selected, and the second choke inductances being connected into the circuit when the second electric machine is selected.

A further aspect provides a method for the selective operation of at least two electric machines, which are each supplied via a plurality of phase lines, a voltage protection module being provided for limiting an intermediate circuit voltage, and one of the electric machines being selected by switching over the phase lines, in each case one second choke inductance being in parallel with one or more first choke inductances, which are arranged in each of the plurality of phase lines between the switch arrangement and the voltage protection module, depending on the electric machine selected.

BRIEF DESCRIPTION OF THE DRAWING

Preferred embodiments of the invention will be explained in more detail below with reference to the attached drawings, in which.

DETAILED DESCRIPTION OF PREFERRED EMBODIMENTS

Figure 1:
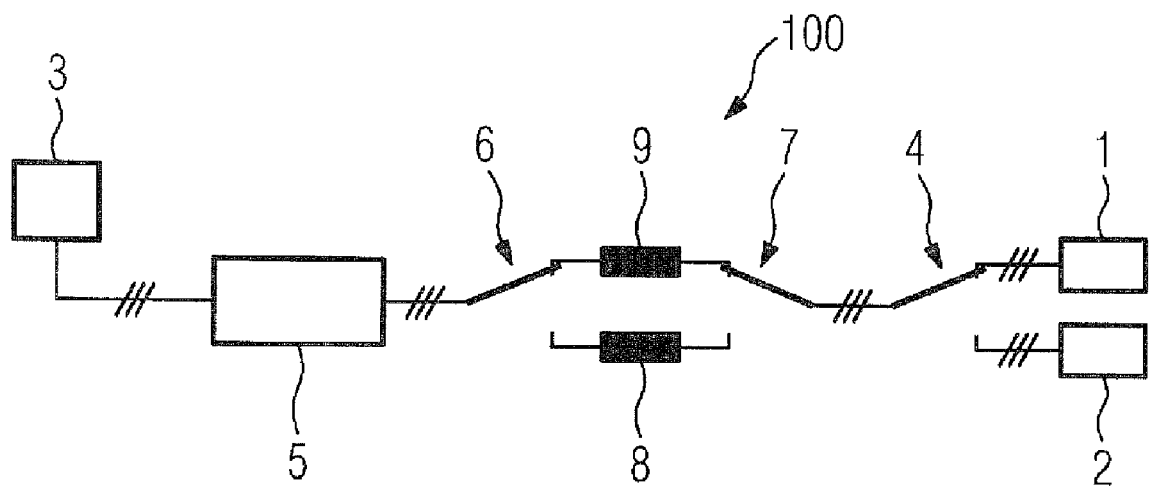
FIG. 1 shows a schematic illustration of a drive system with two selectable motors.

FIG. 1 shows a schematic of a basic circuit 100 for operating two motors 1, 2 using one power section 3. One of the motors 1, 2 is selected by a selector switch 4. The power section 3 is connected to the motors 1, 2 via a voltage protection module (VPM) 5 with a first changeover switch 6 and a second changeover switch 7. The changeover switches are in the form of contactors. A first choke inductance and a second choke inductance 8, 9 for each phase line are located between the first changeover switch 6 and the second changeover switch 7, the changeover switches 6, 7 being operated in such a way that either the first choke inductances 8 or the second choke inductances 9 are connected into the phase lines between the voltage protection module 5 and the respective motor 1, 2.

The voltage protection module 5 is a safety module and ensures that no voltages which are higher than 830 V can arise in the convertor intermediate circuit, and thus the voltage protection module VPM primarily contributes to the converter protection, and also ensures that the spindle is decelerated in a defined time. This is achieved by short-circuiting of the three phase lines.

The circuit shown in FIG. 1 furthermore has the following features:

The motors correspond, for example, to spindle motors and are designed using synchronous technology, i.e. permanent magnets are located in the rotor which cause the excitation of the motor.

Owing to the need to operate the motors at a specific power in the field weakening range, the series-connected choke inductances are required which each need to be matched to the inductance of the respective motor 1, 2.

In the worst case scenario, such as in the event of failure of the power section/actuating drive (pulse suppression), for example, at the maximum speed of the motor, the motor acts as a generator. In this case, an EMF of up to 2 kV can result. The voltage protection module 5 limits this voltage to a maximum of 830 V by virtue of the fact that the three phase lines (power lines) are short-circuited.

The circuit/arrangement of the components (contactors, VPM) needs to be selected in such a way that, even in the event of a voltage failure, the EMF on the phase lines is safely limited.

The requirements as regards the circuitry of the components used will be explained below:

Two motors (spindles) with different parameters in the field weakening range with different choke inductances (series inductors) 8, 9 are operated using one power section 3. In this case, only one motor 1, 2 is ever in operation.

Owing to costs, if possible only one voltage protection module 5 is intended to be used.

Two choke inductances per phase line are required in order to be able to safely operate the two motors in the field weakening range.

Corresponding circuitry between the changeover switches 6, 7 and the choke inductances 8, 9 needs to produce the connection to the motor 1, 2.

The intention is preferably to ensure that, in the event of a voltage failure, the voltage protection module 5 remains connected to the motor (spindle) 1, 2 in order to ensure that the EMF is limited to 830 V. This is not achieved in the proposal above in FIG. 1 since the changeover switches 6, 7 in the form of contactors release in the event of a fault. In addition, the high voltage peaks would damage the contacts of the contactors. Thus, limitation of the EMF and safe deceleration of the corresponding motor 1, 2 would not be ensured in the event of a fault.

Figure 2:
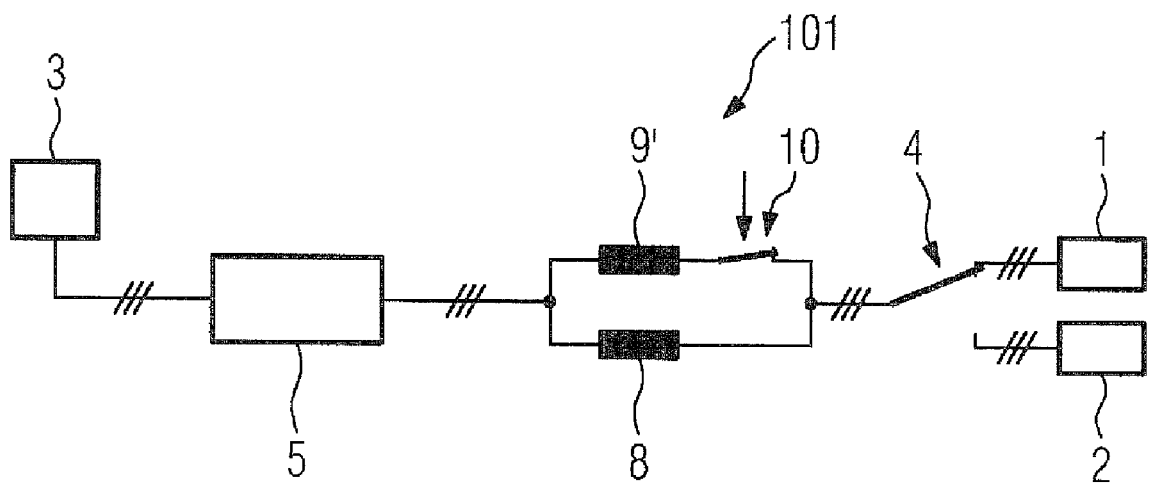
FIG. 2 shows a schematic illustration of a drive system with two selectable motors in accordance with an embodiment of the invention.

FIG. 2 shows an embodiment of the present invention. Identical reference symbols correspond to components of identical or comparable function.

The circuit arrangement 101 of the interconnected components was selected in such a way that the worst case scenario of failure of the power section 3 is managed safely both during operation of the motor 1 and during operation of the motor 2, and thus no unsafe states can occur.

In the embodiment shown in FIG. 2, the voltage protection module 5 is connected to the power section 3 via three phase lines. The voltage protection module 5 is connected to a motor arrangement with a plurality of motors 1, 2 via three phase lines. The motor arrangement comprises the motors 1, 2 to be driven by the common power section 3, it being possible for the motors to be operated only individually using the power section 3. For this purpose, the motor arrangement has a changeover switch 4, which, corresponding to an input variable, selects the respective motor 1, 2 and connects said motor to the phase lines of the voltage protection module 5.

In each case one first choke inductance 8 is located in the phase lines between the voltage protection module 5 and the changeover switch 4.

Second choke inductances 9' can be connected in parallel with each of the first choke inductances 8 via a respective switch 10. The switch 10 is operated depending on the operation of the changeover switch 4 and is preferably driven by the same signal.

The worst case scenario can arise, for example, when one of the motors 1, 2 runs at maximum speed and, precisely at this point in time, the converter located in the power section 3 fails owing to a system voltage failure or another fault on account of pulse suppression.

Choke inductances 8, 9' are required for operating the motor at a specific power in the field weakening range. The inductance of the corresponding choke inductances 8, 9' is dependent on the power of the motor 1, 2 to be operated thereby, the field weakening mode of operation run and the maximum achievable speed of the motor.

One advantage of the circuit arrangement shown in FIG. 2 consists in the fact that the circuitry of the components has been selected in such a way that the requirements (EMF limitation in the worst case scenario) are safely met. This is achieved by the always continuous and inseparable connection between the voltage protection module 5, the first choke inductances 8 and the motor 1, 2 selected at that time. This is also ensured in particular when the switch 10 in the form of a contactor, for example, changes its switching position, for example as a result of a voltage failure.

The circuit also has the advantage that an additional contactor is not required between the voltage protection module

5 and the choke inductances 8, 9', as a result of which the total number of components can be reduced.

The switch 10 is only switched on when the motor 2 is used. Thus, the required total inductance for motor 2 is produced via the connected inductor 9', with the inductance of the parallel circuit comprising the inductance 8 and the inductance 9' being produced as the total inductance in each phase line.

If the above-described worst case scenario now occurs, the motor current can always flow via the choke inductance 8 via the voltage protection module 5 and the EMF of the motor 2 is thus safely limited.

The number of phase lines in the above-described embodiments is assumed to be three, but it is also possible for the number of phase lines to be greater than or less than three. Furthermore, any desired number of motors can be provided instead of only two motors, with these motors being individually selectable. Either no second choke inductances or the second choke inductances 9' which are associated with the respective motor are connected in parallel with the first choke inductances 8, depending on the motor selected.

What is claimed is:

1. A circuit arrangement for selectively operating at least two electric machines, which are each supplied from a single power section having a converter via a plurality of phase lines, comprising:

a voltage protection module connected to an output of the power section for limiting an intermediate circuit voltage of the converter, first choke inductances having first connections fixedly connected to an output of the voltage protection module in each of the plurality of phase lines in one-to-one correspondence and second connections, second choke inductances configured for a switched parallel connection between the first and second connections of the first choke inductances in one-to-one correspondence, said parallel connection being established depending on the selected electric machine, and a switch arrangement arranged between the second connections and phase terminals of the at least two electric machines for switching the second connections to a select one of the at least two electric machines.

2. The circuit arrangement of claim 1, wherein the voltage protection module short-circuits the phase lines depending on the intermediate circuit voltage.

3. The circuit arrangement of claim 1, further comprising a contactor which connects a second choke inductance in parallel with a corresponding first choke inductance, wherein the contactor is actuated by a switching signal which also actuates the switch arrangement.

4. A drive system having at least two electric machines supplied via a plurality of phase lines from a single power section having a converter and a circuit arrangement for selectively operating the at least two electric machines, the circuit arrangement comprising:

a voltage protection module connected to an output of the power section, for limiting an intermediate circuit voltage of the converter, first choke inductances having first connections fixedly connected at an output of the voltage protection module in each of the plurality of phase lines in one-to-one correspondence and second connections, second choke inductances configured for a switched parallel connection between the first and second connections of the first choke inductances in one-to-one correspondence, said parallel connection being established depending on the selected electric machine, and a switch arrangement arranged between the second connections and phase terminals of the at least two electric machines for switching the second connections to a select one of the at least two electric machines.

5. The drive system of claim 4, wherein the first choke inductances are sized for operating a first of the electric machines in a field weakening mode, with the corresponding first and second choke inductances in the phase lines not connected in parallel, and the second choke inductances are sized for operating a second of the electric machines in a field weakening mode, with corresponding first and second choke inductances in at least one of the phase lines being connected in parallel.

6. A method for selectively operating at least two electric machines which are each supplied via a plurality of phase lines from a single power section having a converter, comprising the steps of:

connecting a voltage protection module to an output of the power section for limiting an intermediate circuit voltage, fixedly connecting to the voltage protection module in each of the plurality of phase lines first connections of a first choke inductance, and switchably connecting in each of the plurality of phase lines a second choke inductance in parallel with the first connection and a second connection of a corresponding first choke inductance, said parallel connection being switched depending on a selected electric machine, and switchably connecting the second connections and phase terminals to a select one of the at least two electric machines.

7. The method of claim 6, wherein the voltage protection module short-circuits the phase lines depending on the intermediate circuit voltage.

8. The method of claim 6, and further comprising the step of providing a switching signal, said switching signal simultaneous switching the phase lines to the selected machine and the parallel connection of the first and second choke inductances.

\* \* \* \* \*